United States Patent [19]

Hill

[11] Patent Number: 4,752,161
[45] Date of Patent: Jun. 21, 1988

[54] HAND-HELD DRILL WITH SELF-ADVANCING BIT

[75] Inventor: Ricky C. Hill, Redmond, Wash.

[73] Assignee: The Boeing Company, Seattle, Wash.

[21] Appl. No.: 808,945

[22] Filed: Dec. 16, 1985

[51] Int. Cl.[4] .................................. B23B 39/10
[52] U.S. Cl. ...................... 408/67; 408/127; 408/130
[58] Field of Search ........... 408/107, 11, 13, 8, 408/9, 56, 129, 130, 702, 63, 67, 127

[56] References Cited

U.S. PATENT DOCUMENTS

| 2,488,992 | 11/1949 | Taylor | 408/130 |
|---|---|---|---|
| 2,552,463 | 5/1951 | Searles | 408/56 |
| 2,657,595 | 11/1953 | Shaff . | |
| 2,869,403 | 1/1959 | Bent | 408/702 |
| 2,909,949 | 10/1959 | Winslow . | |
| 3,409,090 | 11/1968 | Brown | 173/29 |
| 3,546,976 | 12/1970 | Clapp et al. . | |
| 3,797,955 | 3/1974 | Peddinghaus et al. | 408/130 |
| 4,329,092 | 5/1982 | Pönitzsch et al. | 408/11 |
| 4,440,529 | 4/1984 | Henslee et al. | 408/1 R |
| 4,553,883 | 11/1985 | Brooks | 408/10 |

FOREIGN PATENT DOCUMENTS 770675 10/1980 U.S.S.R. ................ 408/11

OTHER PUBLICATIONS

"Hydraulic Inserts with Complete Engineering Data", The Lee Company Technical Center, pp. 2 & 3, pp. 184-187, pp. 198 & 199, pp. 234-239, pp. 242 & 243.

Primary Examiner—Z. R. Bilinsky
Attorney, Agent, or Firm—Christensen O'Connor, Johnson & Kindness

[57] ABSTRACT

A hand-held drill is provided that has a pneumatically operated drill motor. A portion of the air that operates the drill motor is directed against the drill motor housing to slidably move the housing within an outer casing to provide a constant feed of the drill bit. The feed rate is controlled by a rate limiter axially aligned with the drill motor and including a piston attached to the drill motor, the piston being mounted within a cylinder filled with hydraulic fluid. The piston has a bore formed through it that permits flow of hydraulic fluid through the bore and a flow control valve is placed within the bore that controls the flow of fluid through the bore to limit the rate of movement of the piston through the hydraulic fluid and thereby control the rate of movement of the drill motor through the casing. Preferably, the drill includes a vacuum collar surrounding the drill bit to remove dust and material particles from the workpiece.

9 Claims, 2 Drawing Sheets

HAND-HELD DRILL WITH SELF-ADVANCING BIT

BACKGROUND OF THE INVENTION

This invention relates to a hand-held drill and more particularly to a hand-held drill with a self-advancing bit that advances at a controlled feed rate.

When drilling holes in certain materials, particularly graphite epoxy composite materials, the use of a hand-held drill is made difficult by the fiber breakout that occurs as the drill tip exits the material being drilled. It has been found that fiber breakout can be minimized by using carbide drills at high speeds (over 15,000 rpm) and with a controlled feed rate of the bit so that a constant pressure is maintained on the surface being drilled while preventing the drill from lunging through the material near the hole exit as the resistance to the thrust is decreased as the material being drilled is removed.

Some drills having an automatic feed rate that have previously been developed have been hampered by excessive drill runout, sometimes caused by improper alignment between the air motor housing and the outer drill housing. Also, there is a need for a smooth control over both drill advancement rate and the return motion of the drill after the drilling operation is complete.

It is therefore an object of the present invention to provide a handheld drill suitable for drilling composites which has an automatic advancing bit that advances under a controlled and sustained feed rate to minimize fiber breakout as the drill bit emerges from the backside of the hole being drilled. It is also an object of the present invention to provide such a constant-feed drill that minimizes drill runout caused by misalignments of the bit and the motor and wherein the drill bit is isolated from side-directed forces on the bit due to transfer of bending moments from the motor to the spindle. It is also an object of the present invention to provide such a drill that operates in the range above 15,000 rpm.

SUMMARY OF THE INVENTION

In accordance with the above-stated objects, a hand-held drill is provided having an outer case which houses a pneumatically powered drill motor. The case includes a first compartment containing the drill motor and an air-routing means integrally formed in the housing to route compressed air entering the housing to the drill motor in such a manner that a portion of the air is utilized to operate the drill motor and a second portion of the air is made to impinge upon a rear surface of the drill motor to force the drill motor forward within the first compartment. A second sealed compartment is provided containing hydraulic fluid and having a piston mounted therein, said piston having openings therein so that it can move through the hydraulic fluid in a first direction which is the same as the direction of advancement of the drill bit, allowing hydraulic fluid to pass through the openings in the piston as it moves in the second compartment. Flow restriction means are provided in the openings formed in the piston to control the flow of hydraulic fluid through the piston as it moves in the first direction and thereby control the rate of speed at which the piston can move through the second compartment. Rigid connecting means are included which connect the drill motor to the piston so that the rate of advancement of the drill motor under force of the compressed air is maintained at a steady rate determined by the rate of flow of the hydraulic fluid through the flow-restricted openings in the piston.

A chuck is provided for accepting a drill bit. The chuck is affixed to a spindle, which in turn is connected to the drill motor. A coupler means between the spindle and the drill motor includes end portions, each of which is connected to the spindle and drill motor, respectively, and a central portion of a diameter less than the end portions interposed between the end portions and integrally formed therewith.

A preferred embodiment of the invention includes a return spring which acts on the piston to return the piston to its initial position, thereby retracting the drill bit upon cessation of the compressed air flow into the first compartment of the drill. The preferred embodiment of the drill includes a handle means affixed to the main casing. The handle means preferably has a compressed air inlet fitting associated therewith for acceptance of the supply of compressed air and has passageway means formed therein to distribute the compressed air to the first compartment and further to route exhaust air from the first compartment back through the handle to exit the drill. The drill motor, piston, spindle and drill bit are mounted substantially coaxially within the casing.

BRIEF DESCRIPTION OF THE DRAWINGS

The objects and advantages of the present invention will be better understood by those of ordinary skill in the art and others upon reading the ensuing specification when taken in conjunction with the appended drawings wherein.

DETAILED DESCRIPTION OF THE PREFERRED EMBODIMENT

Figure 1:
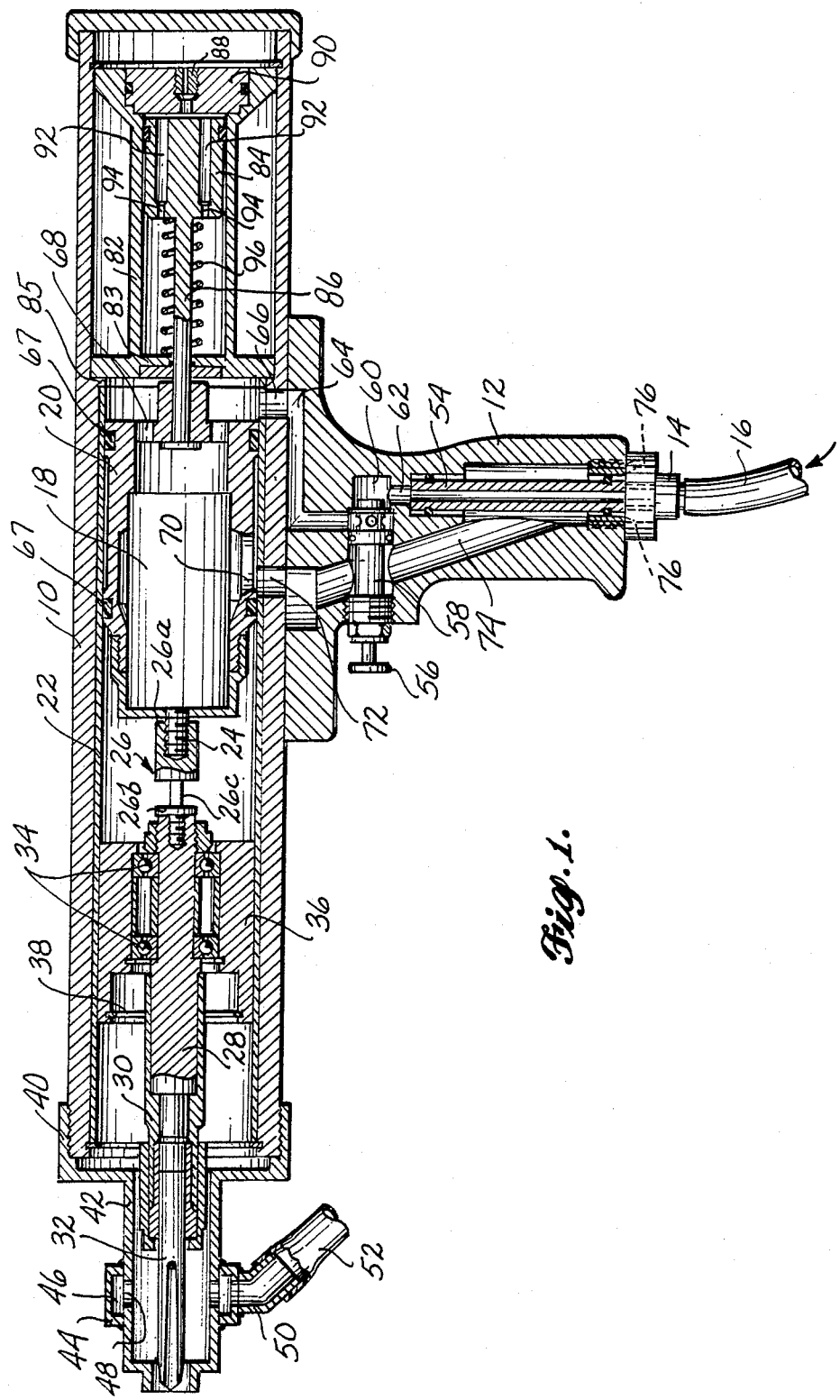
FIG. 1 is a side elevational view in section of one embodiment of a drill made in accordance with the present invention with the bit in a retracted position; and, FIG. 2 is a side elevational view in section of the drill of FIG. 1 with the bit in an extended position.
Figure 2:
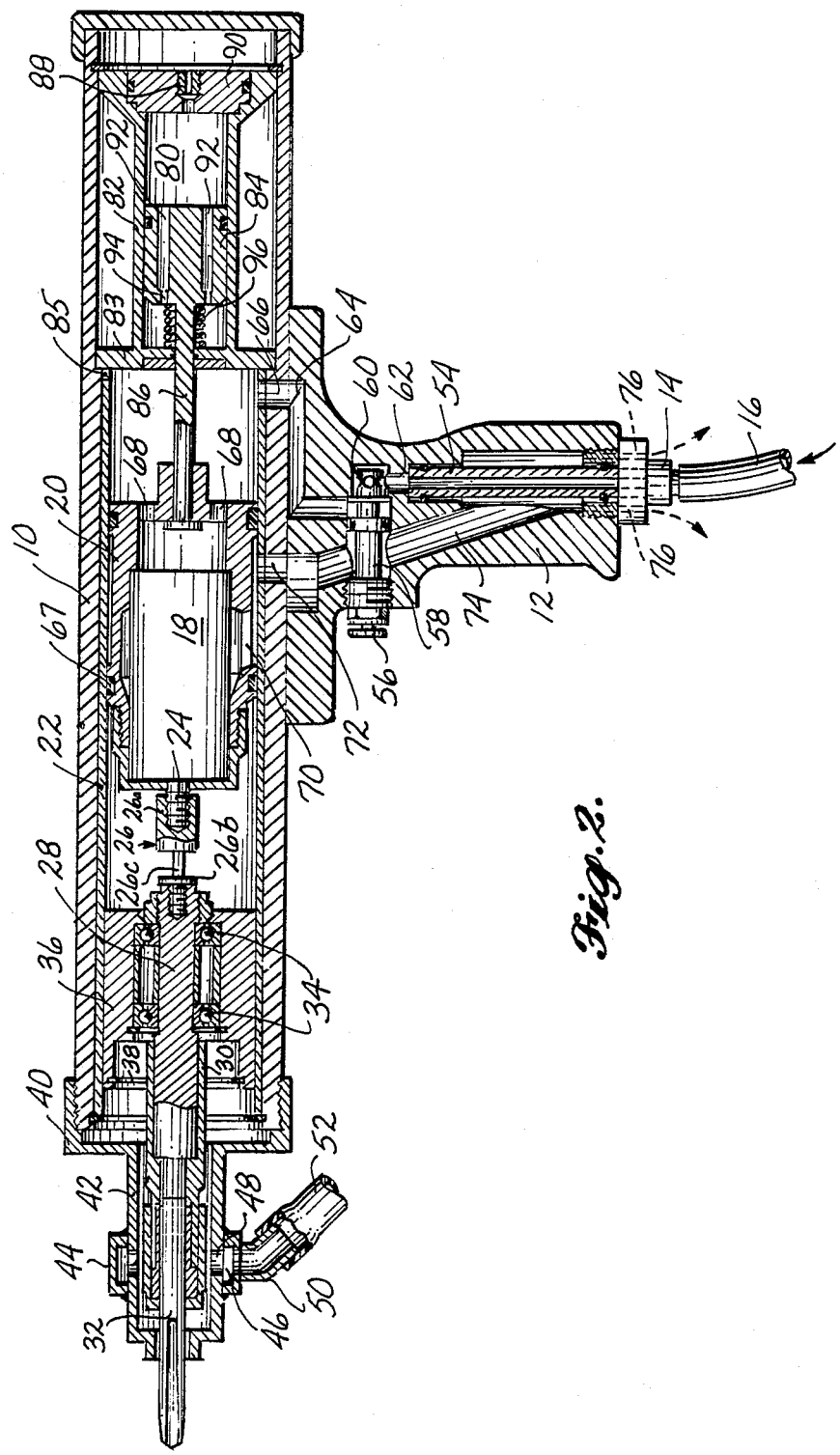

FIG. 1 illustrates a preferred embodiment of a hand-held drill made in accordance with the principles of the present invention. The drill includes a cylindrical outer casing 10 to which is attached a handle piece 12. The outer casing 10 and handle piece 12 are affixed to one another in a manner to allow hand-held operation of the drill in the manner of a handgun. The handle piece is configured in what could be described as a pistol grip configuration. The pistol grip-type handle piece 12 has a fitting 14 at its lowermost end adapted to receive an air line 16 from a source of compressed air (not shown). The handle piece 12 is constructed to contain passageways sufficient to route the compressed air from the source through the handle piece to a drill motor 18 contained within the outer casing 10. The drill motor 18 has an outer housing 20 which is slidably contained within the casing 10. A liner 22 is arranged on the inner surface of the outer casing 10 interposed between the casing and the housing of the drill motor and acts as a bearing sleeve to provide for relatively easy motion of the drill motor housing longitudinally within the outer casing.

The drill motor 18 has a threaded shaft 24 extending forwardly therefrom which is threadably engaged with a first end 26a of a coupling 26. A second end 26b of the coupling threadably engages one end of a spindle 28. The spindle 28 is preferably machined to close tolerance to minimize any eccentricity in the spindle and thereby control drill runout or hole elongation. The other end of the spindle 28 has a chuck 30 attached to it for holding a drill bit 32. Preferably the chuck 30 is a chuck known as a collet-type chuck. A particular collet chuck that has been found to be satisfactory for use in the present invention is the collet chuck manufactured by Erickson Tool Company of Solon, Ohio, modified for mounting on the spindle 28 such as by a press fit of the collet chuck onto the spindle.

The spindle 28 is held in a set of angular contact bearings 34 held within a bearing housing 36 that is free to slide within the sleeve 22. A dust shield 38 that comprises a Teflon or nylon wafer at the forward end of the bearing housing prevents dust from entering the bearing housing to contaminate the bearings and increase the friction. An end cap 40 is threadably engaged with a first end of the outer housing 10 to close the outer casing 10. A drill bit shield tube 42 of cylindrical shape extends from the end cap 40 and surrounds the drill bit 32 when the bit is in the fully retracted position. An annular vacuum housing 44 surrounds the drill bit shield 42 and is formed with an interior channel 46 that communicates with an opening 48 formed in the drill bit shield. The vacuum housing 44 is mounted on the drill bit shield 42 for swivel movement about the drill bit shield. A vacuum coupling 50 is integrally formed with the annular vacuum housing 44 and is adapted for connection to a vacuum line 52, which produces a suction in the interior of the channel 46 and consequently in the interior of the drill bit shield 42 to draw particles removed from the workpiece by the drill bit 32 into a vacuum system connected to vacuum lines 52 to prevent the particles from contaminating the work place surrounding the drilling operation.

The coupling 26 between the drill motor and the spindle is cylindrical in shape and has a central portion 26c of reduced diameter that lies between the ends 26a and 26b of the coupler 26. The diameter of the central portion 26c is less than or equal to one-half of the diameter of either of the ends 26a or 26b. The reduced diameter portion 26c is not truly flexible, but does provide enough flexibility to counteract any transversely directed forces that would tend to be transmitted to the drill bit due to misalignment between the drill motor and the drill bit or eccentric motion of the drill motor. By absorbing the transversely directed forces on the drill bit, the reduced diameter portion serves to limit the linear forces on the drill bit to those axially directed along the drill bit to minimize drill runout and maintain circularity of the holes being drilled.

The handle 12, as was mentioned earlier, is constructed and arranged to route the compressed air to the outer casing 10 to operate the drill motor 18. An interior air conduit 54 within the handle 12 carries the compressed air from the fitting 14 to a valve assembly which is operated by a trigger button switch 56. When the trigger button 56 is depressed, which corresponds to a movement to the right as viewed in FIG. 1, a valve body 58 slides within a valve bore 60 formed in the handle piece to position the valve body such that air from the conduit 54 flows through a passage 62 through the valve body 58 and through a second passage 64 to an opening 66 formed in the outer casing 10. When finger pressure is removed from the trigger button 56 the valve body 58 moves to the left as viewed in FIG. 1, closing the pathway between passages 62 and 64 for the airflow through the handle piece.

The compressed air is routed into the cavity of the outer casing 10 from opening 66 and part of the air enters the interior of the drill motor 18 through openings 68 formed in the rear face of the drill motor housing 20. The compressed air operates the drill motor 18 in a conventional manner. The remainder of the air acts on the rear face of the drill motor housing 20 to force the drill motor 18 to the left as viewed in FIG. 1, such that the bit 32 is extended from the drill bit shield 42 and contacts the workpiece to be drilled. The housing 20 has fluid seals 67 mounted on it to prevent the air from passing between the housing 20 and the liner 22.

Air entering the drill motor 18 to operate the drill motor exits through an exhaust port 70 in the drill motor housing, which is in communication with an opening 72 in the outer casing 10. The opening 72 permits the exhaust air from the drill motor 18 to enter the handle 12 and flow through a passageway 74 formed in the handle to exit through openings 76 at the base of the handle surrounding the fitting 14. The flow of exhaust air through the handle exiting through the base of the handle is desirable in that it prevents the air from being directed into the face of the worker holding the drill or onto the workpiece to scatter dust and particles that have been removed from the workpiece during the drilling process.

In order to provide a constant feed rate for the drill bit 32, it is necessary to place a rate limiter device on the drill motor to determine its rate of movement longitudinally through the casing 10. For this purpose, a hydraulic chamber 80 is provided within the outer casing 10 to the right of the drill motor 18 as viewed in FIG. 1. The hydraulic chamber 80 is defined by a cylindrical wall 82 coaxially aligned with the outer casing 10. A first end of the chamber 80 is closed by a disc-shaped wall 83 integrally formed with the cylindrical wall 82. The wall 83 has an outer diameter substantially equal to the inner diameter of the outer casing 10 and seats against a shoulder 85 formed on the interior surface of the outer casing 10. A piston 84 is slidably mounted within the hydraulic chamber 80 and has a shaft 86 integrally formed therewith that passes through the wall 83 and attaches to the drill motor housing 20. The hydraulic chamber 80 is filled with a hydraulic fluid and any remaining air is bled off through a bleeder valve 88 located in an end cap 90 which closes off the second end of the hydraulic chamber 80. As the drill motor 18 is moved to the left by the air entering the casing 10, it carries with it the piston 84. The motion of the piston 84 is resisted by the hydraulic fluid within the chamber 80. At least one passageway 92 is formed through the piston 84 so that the hydraulic fluid can flow through the piston from the left side to the right side as viewed in FIG. 1 permitting the piston 84 to move longitudinally through the chamber 80. The speed at which the piston can move to the left is determined by the rate at which fluid is transferred through the piston. Therefore, the rate of motion of the drill motor is controlled by limiting the flow rate of fluid through the piston 84 by placing a flow control valve 94 in the passageway 92. In this manner, the piston can only move at a rate determined by the allowable flow of hydraulic fluid through the flow control valve 94 to the other side of the piston. Further, the distance that the drill motor 18 can travel longitudinally is limited by the length of the shaft 86, since the drill motor can move only far enough to bottom the piston 84 against the wall 83 at the first end of the hydraulic chamber 80. A return spring 96 surrounds the shaft 86 and is compressed by the piston 84 as it moves to the left along with the drill motor. When the trigger button 56 is released and the airflow to the drill motor ceases, the force on the drill motor housing also ceases and the return spring 96 is no longer under any compressive force and therefore expands, forcing the piston 84 to the right taking with it the drill motor housing 20 and thereby retracting the bit 32 back into the bit shield 42. Flow control valves can be inserted in additional passageways 92 formed through the piston 84, which allow free flow of hydraulic fluid from the right to the left as viewed in FIG. 1 so that the motion of piston 84 is unimpeded as it moves back to its initial position under the expansion force of the return spring 96. By utilizing different flow control valves in the passageways 92, the feed rate of the drill bit 32 can be controlled by controlling the flow of hydraulic fluid through the passageways 92. Further, the return speed of the piston 84 can be controlled by the size and number of passageways 92 through which the fluid can flow and the type of flow restriction provided for each passageway. While in the preferred embodiment flow is controlled only in the feed direction, it would also be possible to utilize a check valve and flow control arrangement that would limit hydraulic fluid flow to the left as well as to the right to control not only the feed rate of the drill bit, but also the return rate. Typically, it is desired for the drill bit to return as quickly as possible, therefore the return flow through the piston 84 is not limited.

An air-operated drill is therefore provided which includes a hydraulically controlled feed rate, the feed rate being controlled by the flow rate of hydraulic fluid through a piston in a rate limiter cylinder. The drill includes a handle through which compressed air to drive the drill motor enters the drill motor housing and also through which the air exhausted by the drill motor passes to be exhausted from the base of the handle. A portion of the air used to operate the drill motor is also used directly to produce longitudinal motion of the drill motor housing. A coupling having a reduced diameter portion couples the drill motor to the drill bit spindle, the reduced diameter portion acting to compensate for any side-directed forces on the drill bit produced by misalignment of the drill motor. A vacuum collar is attached for swivel motion around a drill bit guide that surrounds the drill bit and the foward end of the drill. The vacuum collar is coupled to a vacuum line that removes dirt and material chips from the workpiece as they are removed by the drill bit. The drill motor housing, rate limiter piston, and drill bit are all substantially coaxially aligned to provide maximum protection against drill runout. A return spring is provided to return the drill to its initial condition upon removal of air from the drill motor.

While a preferred embodiment of the invention has been described and illustrated, it will be understood by those of ordinary skill and others that changes can be made to the described embodiment while remaining within the spirit and scope of the present invention. The arrangement of flow passages through the rate limiter piston can be adjusted for the desired feed rate and return rate of the drill bit, and the various passages for air to flow from the handle to the drill motor can be suitably adjusted as long as they maintain the capability of feeding air to the drill motor to cause sufficient rotation of the motor as well as being directed to the rear of the motor housing to longitudinally move the drill motor through the interior of the casing. Since changes can be made to the illustrated embodiment, while still being within the scope of the invention, the invention is to be defined solely by reference to the appended claims.

The embodiments of the invention in which a property or privilege is claimed are defined as follows:

1. A hand-held drill having a controlled feed rate comprising:
   an outer case including a wall dividing said case into a motor compartment and a limiter compartment;
   a pneumatically powered drill motor having a housing slidably mounted within said motor compartment;
   air entry means in fluid communication with said motor compartment;
   trigger valve means associated with said air entry means and adapted for connection to a source of compressed air, said trigger valve means operable to provide a flow of air from said source to said air entry means;
   air guide means associated with said case and said drill motor housing for channeling said flow of air into said motor compartment and directing a first portion of said compressed air into said drill motor and a second portion of said compressed air directly against said drill motor housing to produce longitudinal movement of said housing within said casing;
   limiter means mounted within said limiter compartment attached to said housing to limit the speed of longitudinal movement of said housing, said limiter means including a piston axially aligned with said drill motor and slidably mounted within said limiter compartment and a connecting rod affixed at a first end to said piston extending through said wall and affixed at a second end to said housing, said limiter compartment containing hydraulic fluid, said piston having at least one bore formed therethrough to allow hydraulic fluid to pass through said piston, a flow limiter means mounted within said bore to limit the rate of flow of hydraulic fluid through said bore;
   a spindle axially aligned with said drill motor; and
   a coupler removably affixed at a first end to said spindle and at a second end to said drill motor, said coupler being cylindrical and including means for damping forces directed transversely to the axis of said coupler, said means including a reduced-diameter portion of said coupler between said first and second ends, said reduced-diameter portion being of a size to make said reduced-diameter portion sufficiently flexible to counteract any forces directed transversely to said coupler.

2. The drill of claim 1 further including a return spring surrounding said rod within said limiter compartment such that said spring is compressed between said piston and said wall as said piston moves toward said wall.

3. The drill of claim 2 wherein the flow of fluid through said flow limiter means is limited only in a direction away from said wall and the flow of fluid toward said wall is unrestricted.

4. The drill of claim 1 further including:
   a bearing housing slidably mounted within said motor compartment; and
   at least one bearing mounted within said bearing housing and surrounding said spindle, said bearing housing and spindle moving in unison.

5. The drill of claim 4 further including:
a collet chuck affixed to said spindle; and
a drill bit removably mounted within said collet chuck.

6. The drill of claim 5 further including:
a drill bit guide affixed to said casing and surrounding said drill bit; and
an annular vacuum collar substantially surrounding said drill bit guide and mounted for swivel motion about said drill bit guide, said vacuum collar having an annular channel formed therein in fluid communication with an opening formed in the wall of said drill bit guide.

7. The drill of claim 1 further including:
a handle affixed to said casing, said air entry means being contained within said handle.

8. The drill of claim 7 further including:
an exhaust aperture formed in the casing cooperable with said drill motor to accept exhaust air from said drill motor, said opening being in fluid communication with an exhaust passage formed in said handle, said exhaust passage directing the flow of exhaust air through said handle.

9. The drill of claim 1 wherein said piston includes a plurality of passages, at least one of said passages containing a flow control valve having flow control in a first direction and free flow in a second direction and the other said passages including check valves arranged to provide for free flow of fluid through the piston in the direction of free flow through the flow control valve and blocking flow of the hydraulic fluid through said piston in the directoin of controlled flow through said flow control valve.

* * * * *